March 11, 1952     G. E. DATH     2,588,488
FRICTION SHOCK ABSORBER FOR RAILWAY DRAFT RIGGINGS
Filed April 11, 1950     2 SHEETS—SHEET 1
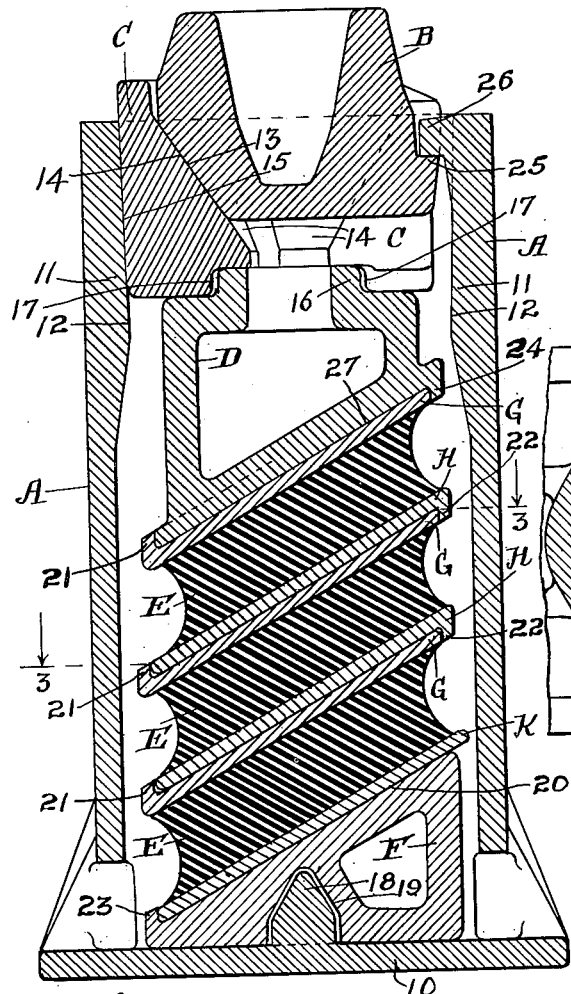
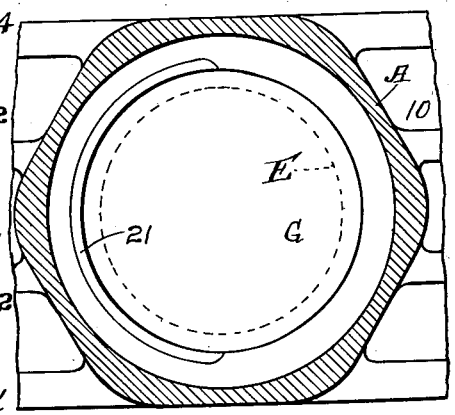
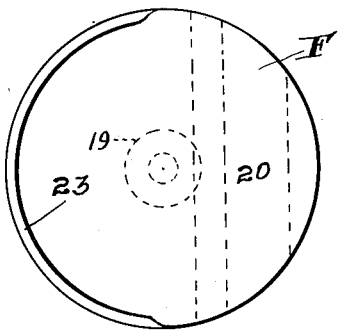
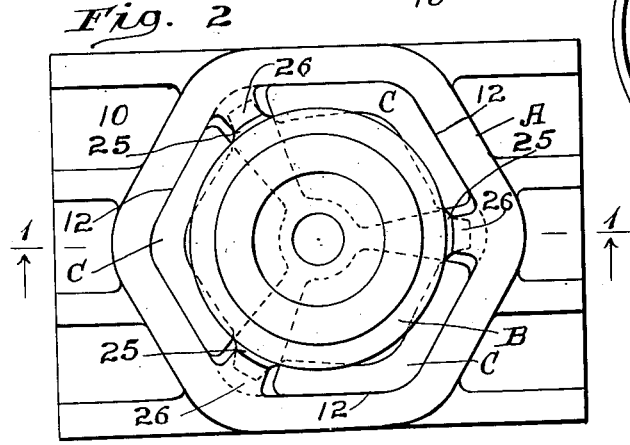
Inventor:
George E. Dath.
By Henry Fuchs
Attys.

March 11, 1952  G. E. DATH  2,588,488
FRICTION SHOCK ABSORBER FOR RAILWAY DRAFT RIGGINGS
Filed April 11, 1950  2 SHEETS—SHEET 2

Inventor:
George E. Dath.
By Henry Fuchs
Atty.

Patented Mar. 11, 1952

2,588,488

UNITED STATES PATENT OFFICE 2,588,488

FRICTION SHOCK ABSORBER FOR RAILWAY DRAFT RIGGINGS

George E. Dath, Mokena, Ill., assignor to W. H. Miner, Inc., Chicago, Ill., a corporation of Delaware Application April 11, 1950, Serial No. 155,275

2 Claims. (Cl. 213—34)

This invention relates to improvements in friction shock absorbers for railway cars, and more particularly for the draft riggings of the same.

One object of the invention is to provide a friction shock absorber of high capacity comprising a friction clutch slidingly telescoped within a friction casing, wherein movement of the clutch inwardly of the casing is yieldingly opposed by a plurality of rubber pads which are subjected to both compression and shear during compression of the mechanism.

Other objects of the invention will more clearly appear from the description and claims hereinafter following.

Figure 5:
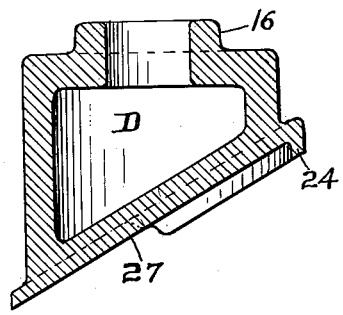
Figure 8:
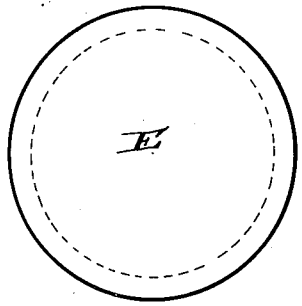
Figure 6:
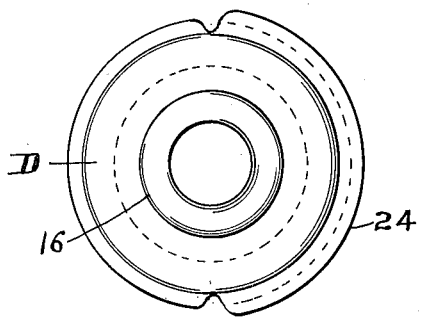
Figure 9:
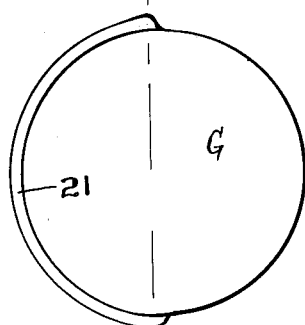
Figure 7:
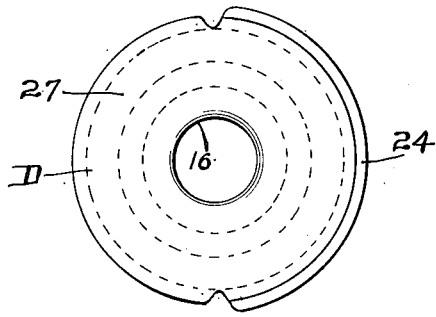
Figure 10:
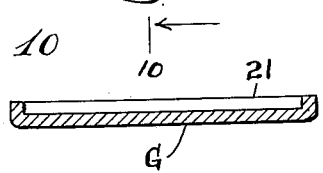

In the accompanying drawings forming a part of this specification, Figure 1 is a sectional view of my improved shock absorber, corresponding substantially to the line 1—1 of Figure 2. Figure 2 is a top plan view of Figure 1. Figure 3 is a horizontal sectional view, corresponding substantially to the line 3—3 of Figure 1. Figure 4 is a plan view of the block at the bottom of Figure 1. Figure 5 is a vertical sectional view of the follower block at the upper end of the friction casing, as seen in Figure 1. Figure 6 is a top plan view of Figure 5. Figure 7 is a bottom plan view of Figure 5. Figure 8 is a top plan view of one of the rubber pads employed in my improved mechanism. Figure 9 is a top plan view of one of the spacer plates employed in my improved mechanism. Figure 10 is a transverse sectional view, corresponding substantially to the line 10—10 of Figure 9.

Referring to the drawings, my improved shock absorber comprises broadly a friction casing A, a wedge block B, three friction shoes C—C—C, a follower D, a plurality of rubber pads E—E—E, and end block F, and spacer plates G, H, and K.

The friction casing A is in the form of a tubular member of hexagonal, transverse cross section, open at its top end, and closed at its bottom end, as viewed in Figure 1, by a transverse wall 10. At the upper end, as shown in Figure 1, the side walls of the casing are inwardly thickened to provide a friction shell section 11, presenting three lengthwise extending, interior friction surfaces 12—12—12 of V-shaped, transverse cross section. The friction surfaces 12—12—12 preferably converge inwardly, as shown in Figure 1.

The wedge block B, which has wedging engagement with the shoes C—C—C, is provided with three wedge faces 13—13—13 at its inner end, which engage with similar wedge faces 14—14—14 on the inner sides of the shoes C—C—C. The shoes C—C—C have lengthwise extending, V-shaped friction surfaces 15—15—15 on their outer sides, which are in sliding engagement with the friction surfaces 12—12—12 of the casing A. Outward movement of the wedge block B with respect to the casing is limited by radially outwardly projecting lugs 25—25—25 on the wedge block, extending between adjacent shoes C—C—C, and engaging in back of interior stop lugs 26—26—26 on the casing A.

The follower D is in the form of a hollow, cylindrical block, bearing on the inner ends of the shoes C—C—C, the same having a central boss 16 at its outer end, and the shoes being cut out, as indicated at 17, to accommodate the boss 16. The inner end face of the follower D is inclined transversely of the mechanism, as indicated at 27.

The block F, which is of cylindrical cross section, is disposed at the closed end of the casing A, being buttressed against the wall 10, which is provided with a central projection 18 engaged in a seat 19 provided in said block. The end face of the block F, which faces the follower D, is inclined in direction parallel to the inclined face 27 of the follower, as indicated at 20.

The rubber pads E are in the forms of heavy discs. The annular side faces of the pads E are concave, as clearly shown in Figure 1. These pads E are three in number and are interposed between the follower D and the block F. The spacer plates G, H, and K are in the forms of circular discs, one plate G being vulcanized to the top side of the rubber pad E, which is at the upper end of the mechanism, and one plate H being vulcanized to the bottom side of said pad. Another plate G is vulcanized to the top side of the rubber pad E, which is at the bottom end of the mechanism, and the plate K is vulcanized to the bottom side of the last named pad and bears on the face 20 of the block F. The intermediate rubber pad E has one of the plates G vulcanized to the top side and one of the plates H vulcanized to the bottom side thereof, the plates G and H of this pad abutting, respectively, the plates H and G of the top and bottom pads.

Each plate G has a semi-annular, peripheral stop flange 21 at the top side thereof, the uppermost plate G, which bears on the follower D, having the flange 21 engaged with the curved outer edge of the follower at the left hand side of the mechanism, as seen in Figure 1. The follower D is provided with a similar flange 24, which engages the curved outer edge of said plate G at the right hand side of the mechanism, as viewed in Figure 1. The bottom plates H and H of the top and intermediate pads E—E have depending semi-annular, peripheral flanges 22—22 at the right hand side, as seen in Figure 1, overhanging and engaged with the right hand side faces of the plates G and G, respectively, and the latter have the flanges 21—21 thereof engaged, respectively, with the curved side edges of the plates H and H at the right hand side of the mechanism. The plate K is vulcanized to the lower side of the bottom pad E and bears on the inclined face 20 of the block F. The block F has an upstanding semi-annular stop flange 23 at its left hand side, engaged with the corresponding side of the lowermost plate K. The topmost plate G is held against displacement toward the right by the flange 24 of the follower D and the flange 21 of this plate. The plates G—G of the intermediate and bottom pads E—E are held against displacement toward the right with respect to the plates H—H by the flanges 22—22 of the latter and the flanges 21—21 of the former, and the plate K of the bottom pad E is held against displacement to the left with respect to the block F by the flange 23 of said block. As will be evident, the pads E—E—E are inclined with respect to the longitudinal axis of the mechanism, and upon the follower D being moved toward the block F in compression of the mechanism, the pads E, E, and E are placed under shear in addition to the compression thereof, due to the inclined positions of these pads, the bottom side of the lowermost pad E being held against movement to the left by the flange 23 of the block F, movement of the lower side of the intermediate pad E being restricted with respect to the bottom pad by the flanges 21 and 22 of the plates of this pad, and movement of the lower side of the top pad E being restricted with respect to the intermediate pad by the flanges 21 and 22 of the plates G and H of the last named pad. Due to the rubber pads E—E—E being placed under both compression and shear during closing movement of the mechanism, the resistance to inward movement of the shoes is considerably increased, thereby increasing the capacity of the shock absorbing mechanism.

I claim:

1. In a friction shock absorbing mechanism, the combination with a friction casing; of a friction clutch slidingly telescoped within the casing; a follower bearing on the inner end of said clutch; an abutment at the opposite end of said casing, said follower and abutment having their opposed faces inclined in the same direction transversely of the mechanism; yielding means opposing movement of the clutch inwardly of the casing, said yielding means comprising a plurality of rubber pads arranged in series lengthwise of the mechanism, and metal spacer plates embracing each pad at opposite sides, said pads and plates being inclined correspondingly to said faces of said follower and abutment, said pads and plates being interposed between said inclined faces of said follower and abutment; and interengaging stop means on adjacent of said plates for holding the same against relative movement in the direction of the inclination of said plates and pads.

2. In a friction shock absorbing mechanism, the combination with a friction casing; of a friction clutch slidingly telescoped within the casing; a follower bearing on the inner end of said clutch; an abutment at the opposite end of said casing, said follower and abutment having their opposed faces inclined in the same direction transversely of the mechanism; yielding means opposing movement of the clutch inwardly of the casing, said yielding means comprising a plurality of rubber pads arranged in series lengthwise of the mechanism, and metal spacer plates embracing each pad at opposite sides, said pads and plates being inclined correspondingly to said faces of said follower and abutment, said pads and plates being interposed between said inclined faces of said follower and abutment; stop means on adjacent plates for holding said plates against relative movement in the direction of inclination of said plates and pads; and stop means on said follower and abutment engaging the adjacent plates to hold said plates against movement in the direction of inclination of said plates and pads.

GEORGE E. DATH.

REFERENCES CITED

The following references are of record in the file of this patent:

UNITED STATES PATENTS

| Number | Name | Date |
| --- | --- | --- |
| 2,165,375 | Heitner | July 11, 1939 |
| 2,463,373 | Gadbois | Mar. 1, 1949 |
| 2,492,337 | Travilla | Dec. 27, 1949 |